W. H. GRIZEL.
SCOOPBOARD.
APPLICATION FILED AUG. 13, 1908.
929,085.
Patented July 27, 1909.
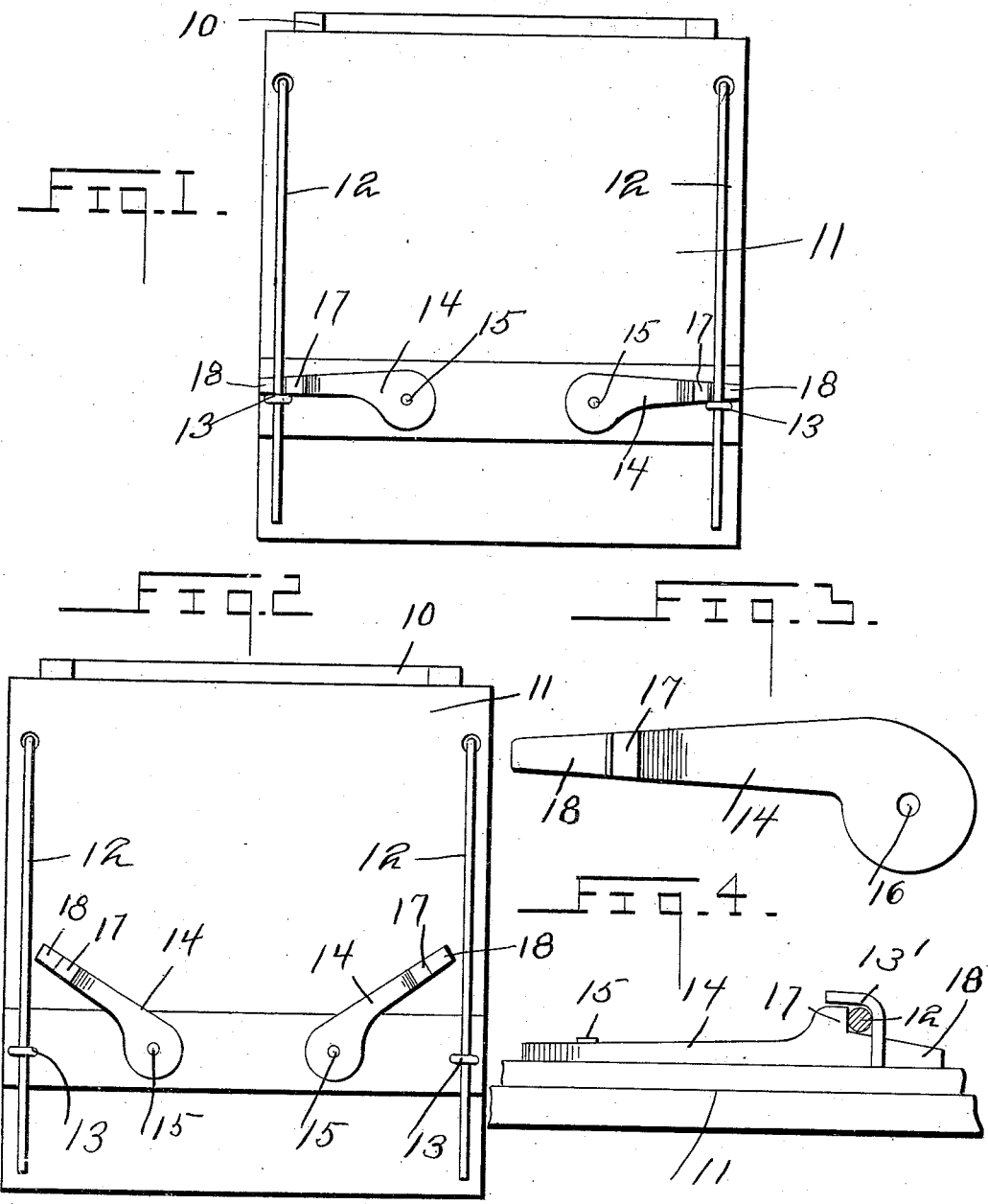
Witnesses
E. E. Johansen
E. L. Chandlee
Inventor
William H. Grizel.
By Woodward & Chandlee
Attorneys

UNITED STATES PATENT OFFICE.

WILLIAM H. GRIZEL, OF IOWA CITY, IOWA.

SCOOPBOARD.

No. 929,085.   Specification of Letters Patent.   Patented July 27, 1909.

Application filed August 13, 1908. Serial No. 448,404.

*To all whom it may concern:*

Be it known that I, WILLIAM H. GRIZEL, a citizen of the United States, residing at Iowa City, in the county of Johnson and State of Iowa, have invented certain new and useful Improvements in Scoopboards, of which the following is a specification.

This invention relates to vehicles, and more particularly to wagon gates, and has for its object to provide a means for securing a pivoted gate fastening rod in closed position.

Another object is to provide such a device which is adaptable to use for fastening pivoted rods of various kinds.

Another object is to provide such a device which may be manufactured at a low cost.

Other objects and advantages will be apparent from the following description, and it will be understood that changes in the specific structure shown and described may be made within the scope of the claims, and that any suitable materials may be used without departing from the spirit of the invention.

In the drawings forming a portion of this specification, and in which like numerals of reference indicate similar parts in the several views, Figure 1 is a rear view of a tail gate in closed position, with the present device attached thereto in operative position, Fig. 2 is a similar view showing the fastener in disengaged position, Fig. 3 is a detail view of the fastening member, Fig. 4 is a bottom view of the device.

Referring to the drawings, there is shown a wagon body 10 having an end gate, or scoopboard 11 pivoted to the bottom thereof, and held in closed position by means of pivoted rods 12 carried by the sides of the wagon body and extending through an opening in the gate 11 being extended downwardly and outwardly of the end gate and disposed beneath hooks 13 adjacent to their outer ends. The rods 12 are held securely in engagement with the hooks 13, by means of the lock 14 as shown. The lock member 14 comprises a pivoted block secured to the end gate by means of a suitable pin 15 engaged through an opening formed through one end of the block. The opposite end of the block has a projecting shoulder 17 formed thereon outwardly of which there is a tapered wedge portion 18 adapted for sliding engagement beneath the rods 12 to press them upwardly against the hooks 13.

It will be seen that the lock member 14 is adapted for use to fasten pivoted rods beneath various forms of hooks or similar devices, and may be attached to a support portion adjacent to such rods without difficulty.

There is shown in Fig. 4 a form of hook member 13' having a straight lateral projection under which the rod is slidably disposed, and the lock member engaged therewith. The shoulder 17 serves to prevent the outward movement of the rod from under such form of retaining member.

A particular object of the invention is to prevent the displacement of the securing rod 12 from beneath the retaining members 13 by the jarring of the wagon to which they may be attached, and the consequent release of the end gate, which might fall outwardly and allow the escape of the contents of the wagon body.

What is claimed is:

1. A lock for pivoted fastening rods for end gates, comprising a hook member adapted to receive a rod slidably thereunder and a pivoted member adapted to engage slidably beneath a rod when disposed within the hook member to prevent displacement of the rod.

2. The combination with pivoted rods and retaining members slidably engaged thereover, of lock members pivoted adjacent to the retaining members and having tapered portions adapted to engage slidably beneath the rods and against the retaining members to press the rods outward, said lock members having also shoulders formed thereon inwardly of their tapered portions to engage against the rods to prevent lateral movement thereof under the retaining members.

3. A wedge member adapted to coöperate with a projecting member for the retention of a movable member beneath the projecting member, and comprising a block having a tapered portion and a shoulder inwardly thereof, and adapted to be pivoted at its opposite end for movement to bring the tapered portion and shoulder into close juxtaposition with a projection, the tapered portion being spaced from the projection and the shoulder being disposed thereagainst for the retention of a movable member against displacement from beneath the projection.

In testimony whereof I affix my signature, in presence of two witnesses.

WM. H. GRIZEL.

Witnesses:
J. A. SHALLA,
WM. PARIZEK.